US010921597B2

(12) United States Patent
Partridge et al.

(10) Patent No.: US 10,921,597 B2
(45) Date of Patent: Feb. 16, 2021

(54) HEADS-UP DISPLAY FOR USE IN UNDERWATER APPLICATIONS

(71) Applicant: Shearwater Research Inc., Richmond (CA)

(72) Inventors: Bruce Gregory Partridge, Richmond (CA); Tyler Coen, Richmond (CA); Mitchell Gordon Burton, Richmond (CA); Jefferson Cervantes, Richmond (CA)

(73) Assignee: Shearwater Research Inc., Richmond (CA)

( * ) Notice: Subject to any disclaimer, the term of this patent is extended or adjusted under 35 U.S.C. 154(b) by 57 days.

(21) Appl. No.: 16/109,356

(22) Filed: Aug. 22, 2018

(65) Prior Publication Data

US 2020/0064632 A1      Feb. 27, 2020

(51) Int. Cl.
| | | |
|---|---|---|
| *G02B 27/01* | (2006.01) | |
| *G02B 5/20* | (2006.01) | |
| *G02B 13/18* | (2006.01) | |
| *B63C 11/12* | (2006.01) | |
| *B63C 11/02* | (2006.01) | |

(52) U.S. Cl.
CPC .......... *G02B 27/0172* (2013.01); *B63C 11/02* (2013.01); *B63C 11/12* (2013.01); *G02B 5/208* (2013.01); *G02B 13/18* (2013.01); *G02B 27/0176* (2013.01); *B63C 2011/021* (2013.01); *B63C 2011/121* (2013.01); *G02B 2027/014* (2013.01); *G02B 2027/0178* (2013.01)

(58) Field of Classification Search
CPC ........ G02B 23/16; G02B 23/22; G02B 23/12; G02B 23/125
See application file for complete search history.

(56) References Cited

U.S. PATENT DOCUMENTS

| | | | |
|---|---|---|---|
| 3,735,382 A | 5/1973 | Soult | |
| 4,236,546 A | 12/1980 | Manley et al. | |
| 5,301,668 A * | 4/1994 | Hales ..................... | A62B 18/08 |
| | | | 128/200.24 |
| 5,526,280 A | 6/1996 | Consadori et al. | |
| 5,539,422 A | 7/1996 | Heacock et al. | |
| 5,886,822 A | 3/1999 | Spitzer | |
| 6,032,664 A | 3/2000 | Gray et al. | |
| 6,181,644 B1 | 1/2001 | Gallagher | |
| 6,204,975 B1 | 3/2001 | Watters et al. | |
| 6,401,714 B1 | 6/2002 | Giorgini | |
| 6,519,548 B1 | 2/2003 | Kuroda et al. | |

(Continued)

FOREIGN PATENT DOCUMENTS

| | | |
|---|---|---|
| WO | 2010076177 | 7/2010 |
| WO | 2012035021 | 3/2012 |

OTHER PUBLICATIONS

Open Safety. Apocalypse Type IV Rebreather User Manual. copyright 2009.

*Primary Examiner* — Robert E. Tallman
(74) *Attorney, Agent, or Firm* — Oyen Wiggs Green & Mutala LLP; Nicholas Garner

(57) ABSTRACT

A heads-up display comprises a housing, a pressure sealed optical element disposed at a front end of the housing, and a dive computer disposed within the housing. The dive computer includes a display panel. There is a lens disposed in the housing between the infrared cut-off filter and the display panel.

20 Claims, 7 Drawing Sheets

(56) References Cited

U.S. PATENT DOCUMENTS

| | | |
|---|---|---|
| 6,671,100 B1 * | 12/2003 | McRuer ............ G02B 27/0081 359/630 |
| 6,856,578 B2 | 2/2005 | Magine et al. |
| 6,868,360 B1 | 3/2005 | Olstad et al. |
| 7,038,639 B1 | 5/2006 | Olstad et al. |
| 7,628,153 B2 | 12/2009 | Juergensen |
| 7,639,208 B1 | 12/2009 | Ha et al. |
| 7,927,558 B2 | 4/2011 | Kirollos et al. |
| 8,028,696 B2 | 10/2011 | Juergensen |
| 8,159,751 B2 | 4/2012 | Martins |
| 9,104,024 B2 | 8/2015 | Partridge et al. |
| 9,908,599 B2 | 3/2018 | Zulonas et al. |
| 2004/0046710 A1 | 3/2004 | Adams et al. |
| 2005/0183721 A1 | 8/2005 | Juergensen |
| 2005/0217676 A1 | 10/2005 | Parker |
| 2007/0215157 A1 | 9/2007 | Straw |
| 2008/0106489 A1 | 5/2008 | Brown |
| 2009/0126482 A1 | 5/2009 | Fundak et al. |
| 2009/0161225 A1 | 6/2009 | Liu |
| 2010/0254017 A1 | 10/2010 | Martins |
| 2012/0132207 A1 | 5/2012 | Straw |
| 2012/0235902 A1 | 9/2012 | Eisenhardt et al. |
| 2013/0044043 A1 | 2/2013 | Abdollahi et al. |
| 2013/0222213 A1 | 8/2013 | Abdollahi et al. |
| 2013/0222235 A1 | 8/2013 | Abdollahi et al. |
| 2013/0257621 A1 | 10/2013 | Juergensen |

* cited by examiner

HEADS-UP DISPLAY FOR USE IN UNDERWATER APPLICATIONS

BACKGROUND OF THE INVENTION

Field of the Invention

The present invention relates to a heads-up display for use in underwater applications and, in particular, to a heads-up display with an aspheric lens for use in underwater applications.

Description of the Related Art

It is known to provide a heads-up display for underwater applications. For example, U.S. Pat. No. 9,104,024 which issued on Aug. 11, 2015, to Partridge et al. discloses a heads-up display comprising a housing and a display panel disposed within the housing. There is also an objective lens and an achromatic lens is disposed within the housing. The achromatic lens is disposed within the housing between the display panel and the objective lens. Information on the display panel is visible by a user looking through the objective lens and the achromatic lens. The heads-up display is coupled to a rebreather and may be coupled the rebreather by an articulate mounting arm.

SUMMARY OF THE INVENTION

There is provided a heads-up display comprising a housing, a pressure sealed optical element disposed at a front end of the housing, and a dive computer disposed within the housing. The dive computer includes a display panel. There is a lens disposed in the housing between the infrared cut-off filter and the display panel. The lens may be an aspheric lens. The pressure sealed optical element may be an infrared cut-off filter. The housing may be waterproof. The housing may be configured to be releaseably retained by a mount. The heads-up display may further include a battery which powers the dive computer.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
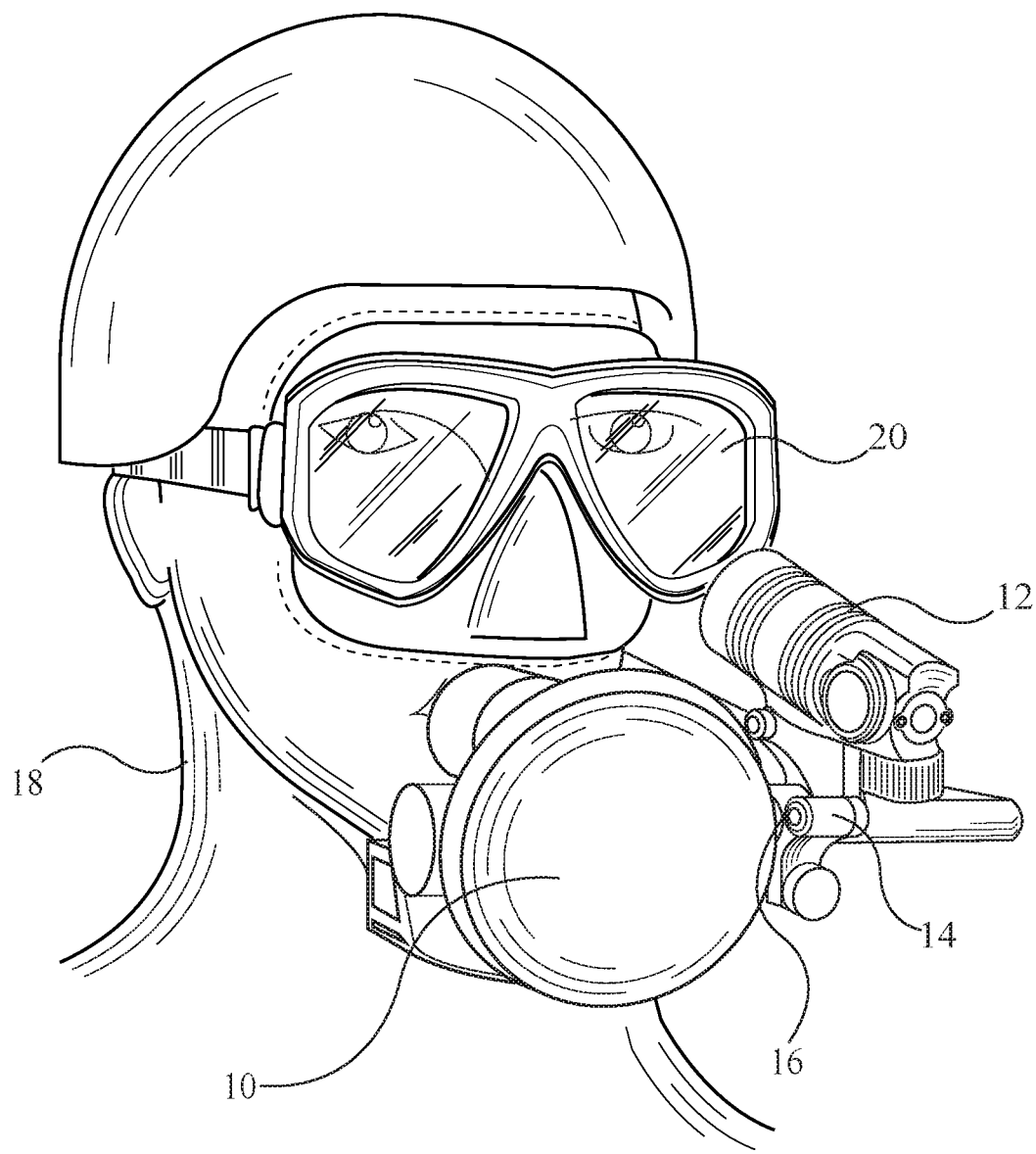
FIG. 1 is a perspective view of a heads-up display mounted on a regulator and worn by a user.

Referring to the drawings and first to FIG. 1, a regulator 10 is shown in fragment. The regulator 10 is a conventional regulator commonly used by divers and is accordingly not described in detail herein. There is an improved heads-up display 12 coupled to the regulator 10 by a mount 14. In this example, the heads-up display is mounted to a second stage hose fitting 16 of the regulator 10. The mount 14 may be an articulated mount to allow a user 18 to adjust a position of the heads-up display 12 in order to place the heads-up display 12 in a line of sight of the user 18 through goggles 20.

Figure 2:
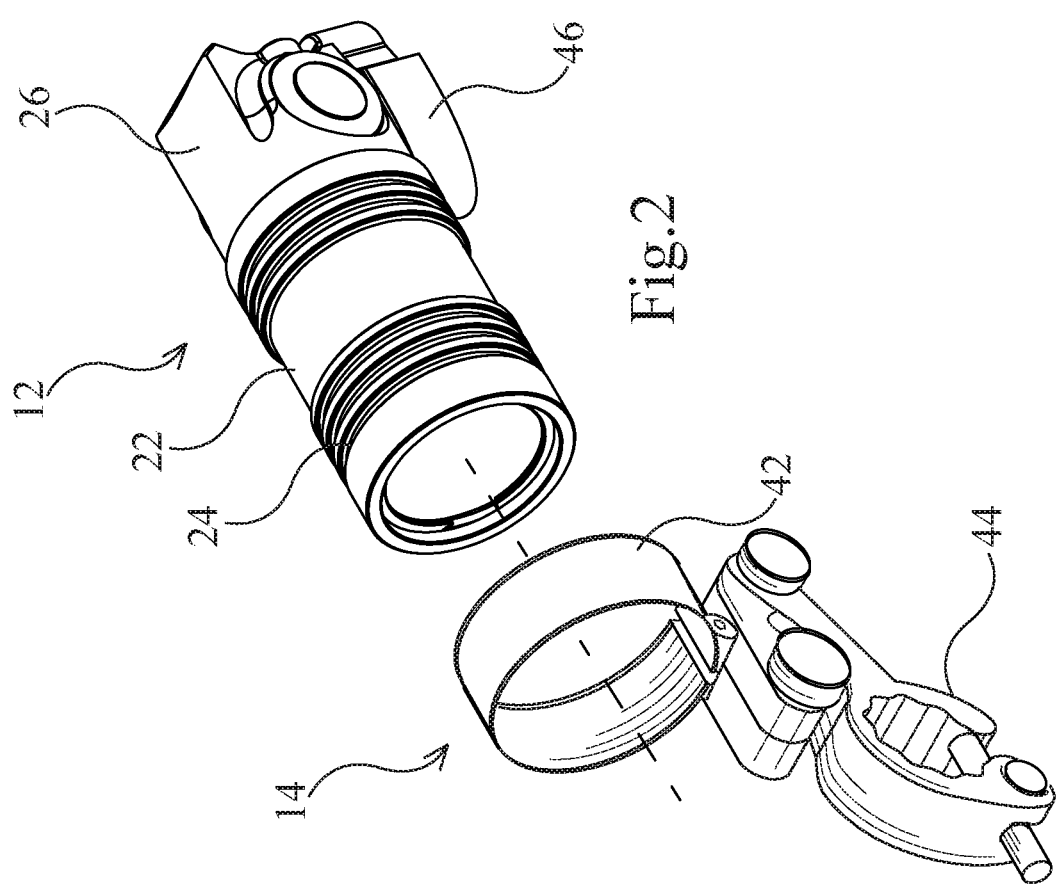
FIG. 2 is a perspective view of the heads-up display shown in FIG. 1.
Figure 3:
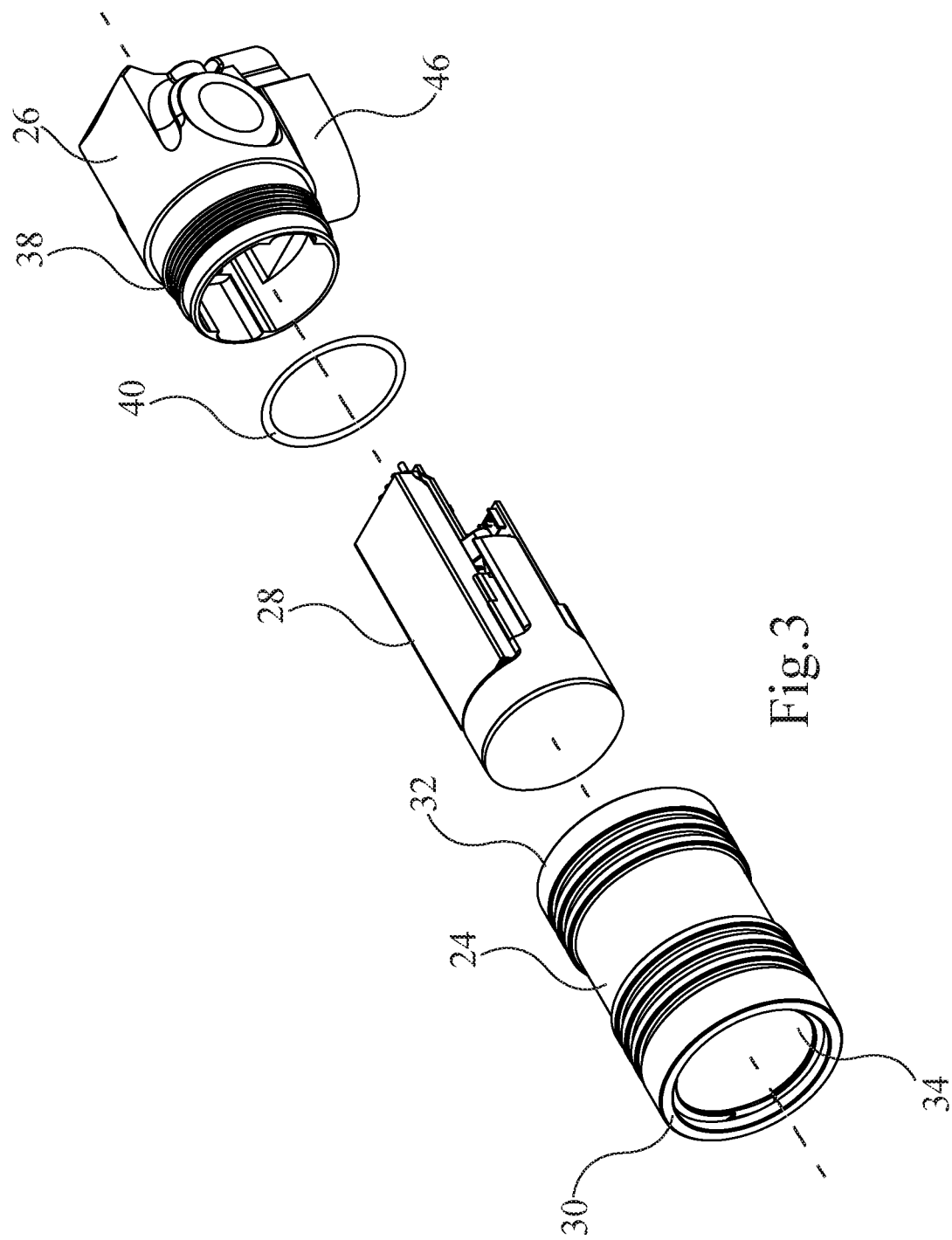
FIG. 3 is an exploded view of the heads-up display shown in FIG. 2.

The heads-up display 12 and the mount 14 are shown in greater detail in FIG. 2. The heads-up display 12 generally comprises a waterproof housing 22 having a front housing portion 24 and a rear housing portion 26 which, as shown in FIG. 3, house a dive computer 28. In this example, the front housing portion 24 is substantially cylindrical and has a front end 30 and rear end 32. There is a pressure sealed optical element 34 at the front end 30 of the front housing portion 24 and there is internal threading (not shown) at the rear end 32 of the front housing portion 24. The pressure sealed optical element 34 is an infrared cut-off filter, in this example, but the pressure sealed optical element may be any type of pressure sealed optical element 34 suitable for a heads-up display. There is an O-ring 40 which seals the rear housing portion 26 and the front housing portion 24 when the housing 22 is assembled. Referring back to FIG. 2, the mount 14 generally comprises a collar 42, which releaseably retains the heads-up display 12, and a clamp 44 which releaseably clamps to the mount 14 in position. The heads-up display 12 may also be provided with mounting holes, for example mounting hole 46, to allow for custom mounting. The heads-up display 12 is a stand-alone heads-up display.

Figure 4:
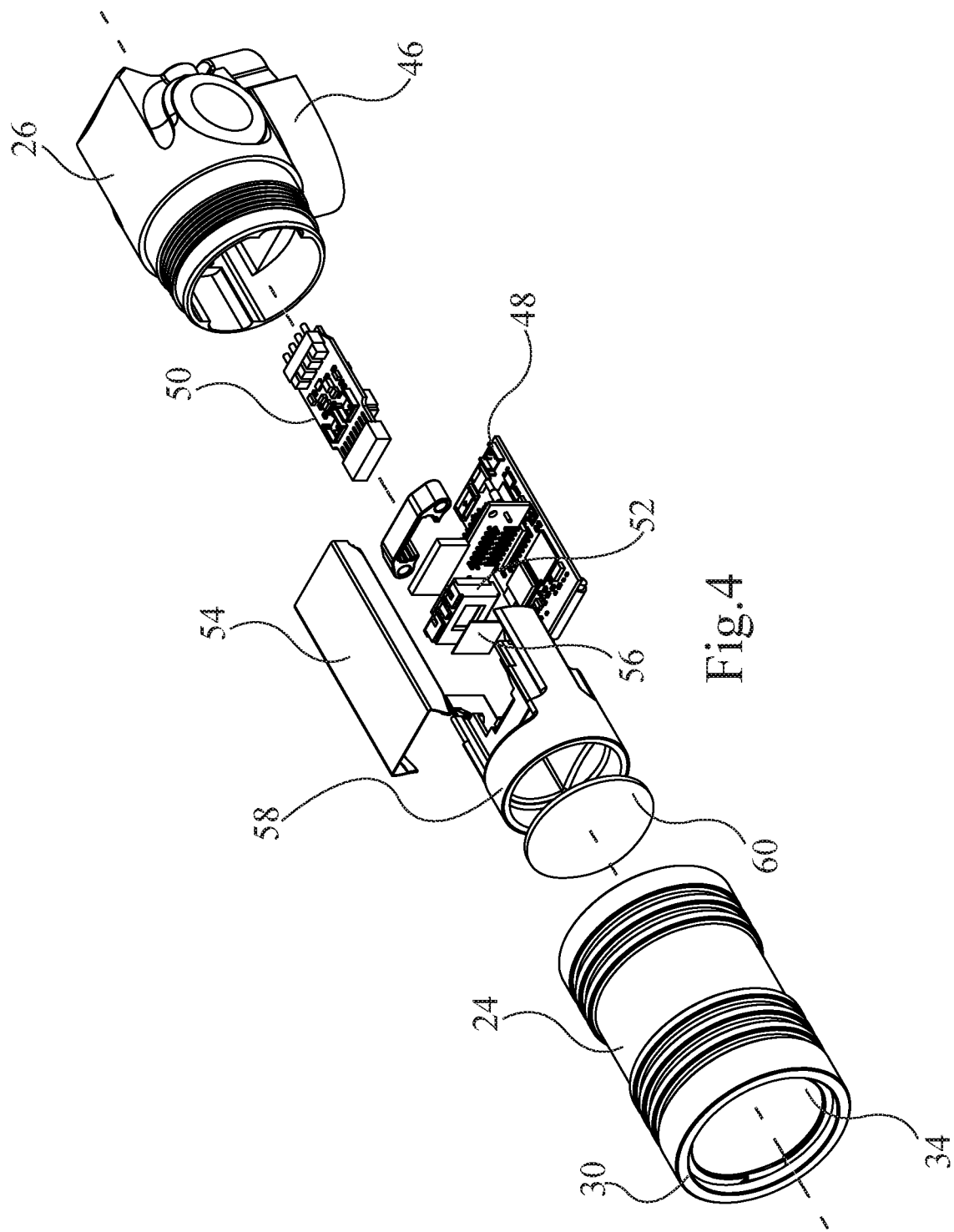
FIG. 4 is another exploded view of the heads-up display shown in FIG. 2.

The dive computer 28 is shown in greater detail in FIG. 4. There is a main printed circuit board assembly 48 and a daughter printed circuit board assembly 50. There is a display panel 52 mounted on the main printed circuit board assembly 48. The display panel 52 is an LCD display panel, in the example, but the display panel may be any type of display panel suitable for a heads-up display. There is also a battery 54 which powers the dive computer 28. A polarizing filter 56 overlays the display panel 52 and there is a lens spacer 58 which spaces-apart the display panel 52 and a lens 60. The lens 60 is an aspheric lens, in this example, but the lens may be any type of lens suitable for a heads-up display. The lens 60 is disposed between the display panel 52 and the infrared cut-off filter 34. Information on the display panel 52 is visible by the user 18 looking through the infrared cut-off filter 34 and the lens 60.

Figure 5:
FIG. 5 is a perspective of the heads-up display shown in FIG. 2 mounted on a helmet and worn by a user.
Figure 6:
FIG. 6 is a perspective of the heads-up display shown in FIG. 2 mounted on a rebreather and worn by a user.
Figure 7:
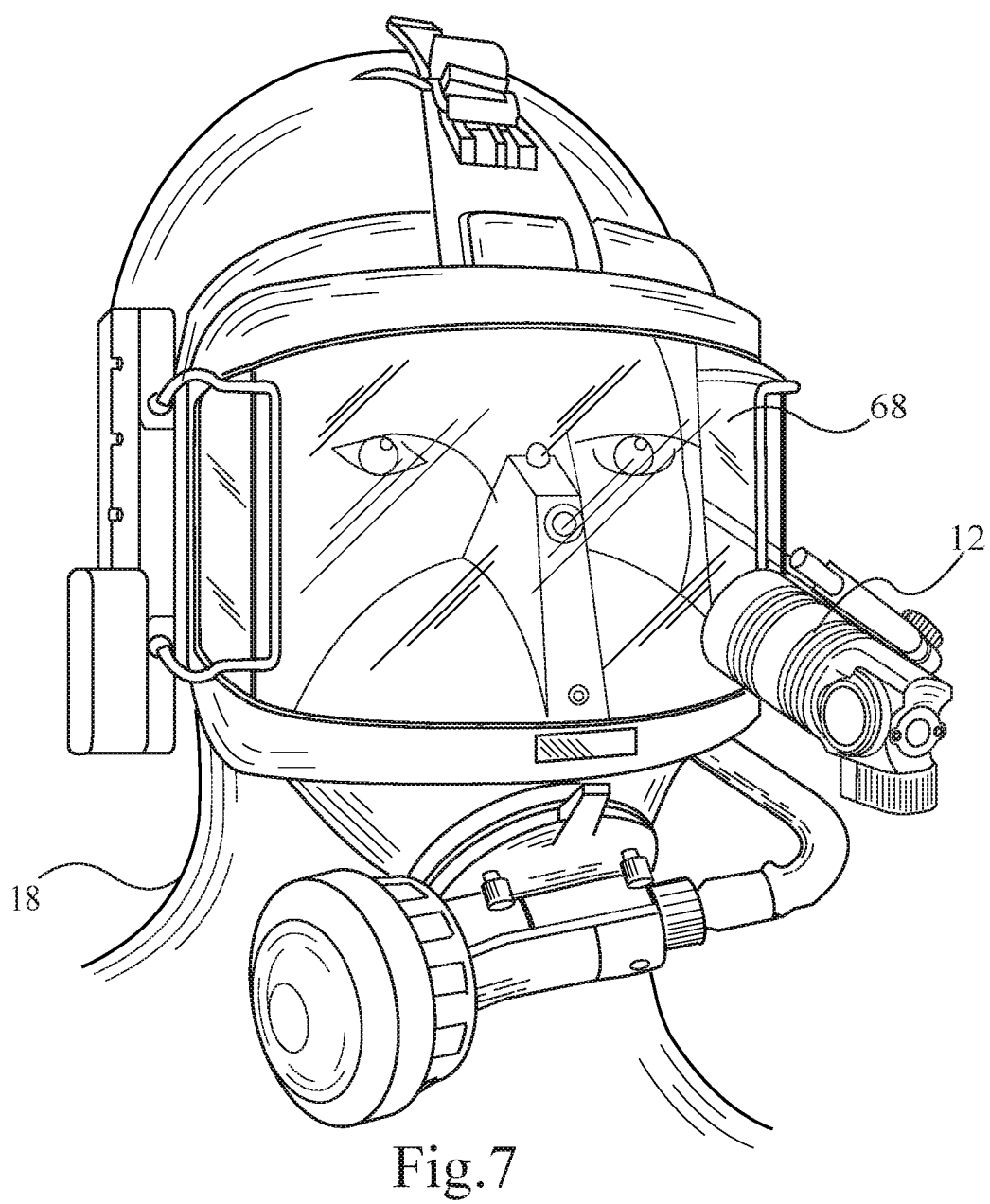
FIG. 7 is a perspective of the heads-up display shown in FIG. 2 mounted on a scuba mask worn by a user.

FIG. 5 shows the heads-up display 12 custom mounted on a helmet 62 worn by the user 18. In this example, the heads-up display is mounted on the helmet 62 using an articulated mounting arm 64. FIG. 6 shows the heads-up display 12 custom mounted on a helmet 64 worn by the user 18 wearing a rebreather 66. FIG. 7 shows the heads-up display 12 custom mounted on a scuba mask 68 worn by the user 18. It will be understood by a person skilled in the art that the heads-up display 12 may be custom mounted in other manners.

It will also be understood by a person skilled in the art that many of the details provided above are by way of example only, and are not intended to limit the scope of the invention which is to be determined with reference to the following claims.

What is claimed is:

1. A heads-up display comprising:
   a housing having a front housing portion and a rear housing portion to which the front housing portion thereof couples via a rear end of the front housing portion thereof;
   a pressure sealed optical element disposed at a front end of the front housing portion of the housing;
   a dive computer disposed within the rear housing portion of the housing, the dive computer including a display panel; and
   a lens disposed in the housing between the pressure sealed optical element and the display panel.

2. The heads-up display as claimed in claim 1 wherein the lens is an aspheric lens.

3. The heads-up display as claimed in claim 1 wherein the pressure sealed optical element is an infrared cut-off filter.

4. The heads-up display as claimed in claim 1 wherein the housing is waterproof.

5. The heads-up display as claimed in claim 1 wherein the housing is configured to be releasably retained by a mount.

6. The heads-up display as claimed in claim 1 further including a battery which powers the dive computer.

7. In combination, a heads-up display, and an articulated mount which allows positioning of the heads-up display to be adjusted, and the heads-up display comprising:
   a housing to which the mount couples;
   a pressure sealed optical element disposed at a front end of the housing;
   a dive computer disposed within the housing, the dive computer including a display panel; and
   a lens disposed in the housing between the pressure sealed optical element and the display panel.

8. The heads-up display as claimed in claim 1 wherein the housing is substantially cylindrical.

9. The heads-up display as claimed in claim 1 further including an O-ring which seals the rear housing portion and the front housing portion when the housing is assembled.

10. The heads-up display as claimed in claim 1 wherein the front housing portion and the rear housing portion of the housing threadably couple together.

11. Use of the heads-up display as claimed in claim 1 for underwater applications.

12. In combination, the heads-up display as claimed in claim 1 and a mount which allows positioning of the heads-up display to be adjusted.

13. In combination, the heads-up display as claimed in claim 1 and a mount configured to couple the heads-up display to a regulator.

14. In combination, the heads-up display as claimed in claim 1 and a mount configured to couple the heads-up display to a second stage hose fitting of a regulator.

15. In combination, the heads-up display as claimed in claim 1 and a mount configured to couple the heads-up display to a helmet.

16. In combination, the heads-up display as claimed in claim 1 and a mount configured to couple the heads-up display to a scuba mask.

17. The combination as claimed in claim 16 wherein the mount spaces the housing from the scuba mask.

18. The heads-up display as claimed in claim 1 wherein the pressure sealed optical element, the display panel and the lens align along a common axis.

19. The combination as claimed in claim 7, wherein the waterproof housing is releasably retained by the mount.

20. In combination, a heads-up display, and a mount which allows positioning of the heads-up display to be adjusted, the mount including a collar which releasably retains the heads-up display and a clamp which releasably clamps the mount in position, and the heads-up display comprising:
   a housing to which the mount couples;
   a pressure sealed optical element disposed at a front end of the housing;
   a dive computer disposed within the housing, the dive computer including a display panel; and
   a lens disposed in the housing between the pressure sealed optical element and the display panel.

* * * * *

UNITED STATES PATENT AND TRADEMARK OFFICE
CERTIFICATE OF CORRECTION

PATENT NO. : 10,921,597 B2
APPLICATION NO. : 16/109356
DATED : February 16, 2021
INVENTOR(S) : Bruce Gregory Partridge et al.

Page 1 of 1

It is certified that error appears in the above-identified patent and that said Letters Patent is hereby corrected as shown below:

In the Claims

Column 4, Line 25:
19. The combination as claimed in claim 7, wherein the waterproof housing is releasably retained by the mount.

Should read:
19. The combination as claimed in claim 7, wherein the housing is releasably retained by the mount.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*